Sept. 18, 1956     H. J. BICHSEL     2,763,771
SINGLE PHASE RECTIFIER ARC WELDER Filed June 26, 1952     2 Sheets-Sheet 1

WITNESSES:

INVENTOR
Harry J. Bichsel.
BY
ATTORNEY

Sept. 18, 1956  H. J. BICHSEL  2,763,771
SINGLE PHASE RECTIFIER ARC WELDER
Filed June 26, 1952  2 Sheets-Sheet 2

WITNESSES:
Robert C. Baird
Leon J. Toya

INVENTOR
Harry J. Bichsel.
BY
Hyman Diamond
ATTORNEY

United States Patent Office 2,763,771
Patented Sept. 18, 1956

2,763,771

SINGLE PHASE RECTIFIER ARC WELDER

Harry J. Bichsel, East Aurora, N. Y., assignor to Westinghouse Electric Corporation, East Pittsburgh, Pa., a corporation of Pennsylvania Application June 26, 1952, Serial No. 295,756

6 Claims. (Cl. 219—131)

My invention relates to electric discharge apparatus and has particular relation to arc welding apparatus.

This application covers an invention arising out of my work with the arc welding apparatus disclosed in application Serial No. 176,302, filed July 28, 1950, to Charles P. Croco; Charles H. Jennings, Ray Verne Lester and Emil F. Steinert, and an application, Serial No. 273,814, filed February 28, 1952, now U. S. Patent 2,734,981 granted February 14, 1956, to Harry J. Bichsel and Martin Rebuffoni, both applications being assigned to Westinghouse Electric Corporation. In these applications, arc-welding apparatus is disclosed which is supplied with direct current from a polyphase source. Because the apparatus disclosed in these applications derives its power from a polyphase source and the power demand is distributed over the three phases, the drain of the apparatus on any one of the phases is reduced. This advantage of the apparatus is highly important in situations in which the current demand of the welding apparatus is heavy. In situations in which the demand is relatively light, the drain is not such as to warrant the cost of a three-phase unit. In such situtations, a single-phase unit would be satisfactory.

With this consideration in mind, I carried out extensive development work on a single-phase rectifier unit analogous to that disclosed in the above-identified applications. In experimenting with such a unit, constructed along the lines of the three-phase unit, I have found that the operation is relatively unstable. The instability may to an extent be reduced by interposing an inductive reactor in the direct current load circuit, but such a reactor is bulky and costly because it must be designed to carry the full load current.

It is accordingly an object of my invention to provide a stable rectifier arc-welding system which shall derive its power from a single-phase supply.

Another object of my invention is to provide a reliable single-phase rectifier arc welder.

A more specific object of my invention is to provide a reliable single-phase rectifier arc welder of low cost having low maintenance and installation costs.

An ancillary object of my invention is to provide a novel rectifier circuit.

Another ancillary object of my invention is to provide in an arc welder a low cost auxiliary circuit which shall at the same time maintain stability, provide "hot start" and provide arc drive.

My invention in its broader aspects arises from the discovery that the instability in the single-phase rectifier arc welders with which I have experimented is caused predominantly by the periodic drop in the output of the rectifier to a relatively low value as the voltage of the single phase supply passes through zero. As a result of this drop, the arc is periodically extinguished. In a polyphase rectifier arc welder, this decrease in output causes no difficulty because it occurs for only one phase at a time and is compensated by the output of the other phases which are, at the time that the voltage of one phase is passing through zero, of substantial magnitude and maintain the arc. The instability of a single-phase rectifier arc welder arising from the periodic decrease in load current during the zero intervals of the supply has led me to experiment with inductive reactance in the rectifier circuit, that is, between the rectifier and the welding electrode and work. This reactance to perform its function properly must be very large and excessively costly, as has been noted.

Further investigations have led me to the discovery that the welding current must be stabilized over a certain range and that this range in the customarily encountered welder lies between 10 and 250 amperes. I have found, by experiment, that instability is prevented if the arc current in an arc welder is prevented from reaching a magnitude which is less than about 10 amperes.

In accordance with the broader aspects of my invention, I accordingly provide apparatus for preventing the arc current from dropping below about 10 amperes. Such apparatus may be characterized by a small auxiliary rectifier designed to supply about 10 amperes, which supplies the arc in addition to the main rectifier.

According to one aspect of my invention, this rectifier may be connected directly between the electrode and the work. If it is, provisions must be made to assure that the depressions in the current produced by the auxiliary rectifier do not occur simultaneously with the depressions produced by the main rectifier. The auxiliary rectifier is accordingly supplied with potential displaced in phase by an angle of the order of 90° with reference to the main rectifier potential. The maximum current of the auxiliary rectifier then occurs at the same instant as the minimum current of the main rectifier and the instability is, to an extent, suppressed.

I have found in experimenting with this apparatus that while it approximates stability, the operation is not entirely stable for many purposes. Further investigation of the cause of this instability has revealed that the phase displacement of the currents from the main and auxiliary rectifiers does not remain constant, but varies over a wide range with the arc voltage. I have found that this variation may approach 90° as the arc voltage varies from zero to 45 volts. Thus, with the phase shift set for the auxiliary-current maximum to occur simultaneously with the main current minimum, at 0 volts arc voltage, the phase shift at 45 volts arc voltage may be such that the minimum current for the auxiliary rectifier and the minimum current for the main rectifier coincide. Under such circumstances, instability would necessarily result.

In accordance with a specific aspect of my invention, I have accordingly provided a system in which a relatively small inductive reactor is included in the auxiliary rectifier circuit. Since the auxiliary rectifier need only supply of the order of 10 amperes, this reactor is small and of relatively low cost. I have found that the auxiliary rectifier circuit with the reactor maintains the welding arc stable. In addition to accomplishing this purpose, the auxiliary circuit also produces a transient during starting which aids in starting the arc at low currents and thus in effect adds a so-called "hot start" feature to the apparatus. In addition, the auxiliary circuit supplies current at times when the arc potential is approaching short-circuit conditions to blow out the short-circuit. Thus, it has an effect similar to the arc-drive effect disclosed in application, Serial No. 273,814 mentioned above.

The novel features that I consider characteristic of my invention are set forth generally above. The invention itself, both as to its organization and its method of operation, together with additional objects and advantages thereof, will best be understood from the following description of a specific embodiment when read in connection with the accompanying drawings, in which.

Figure 1:
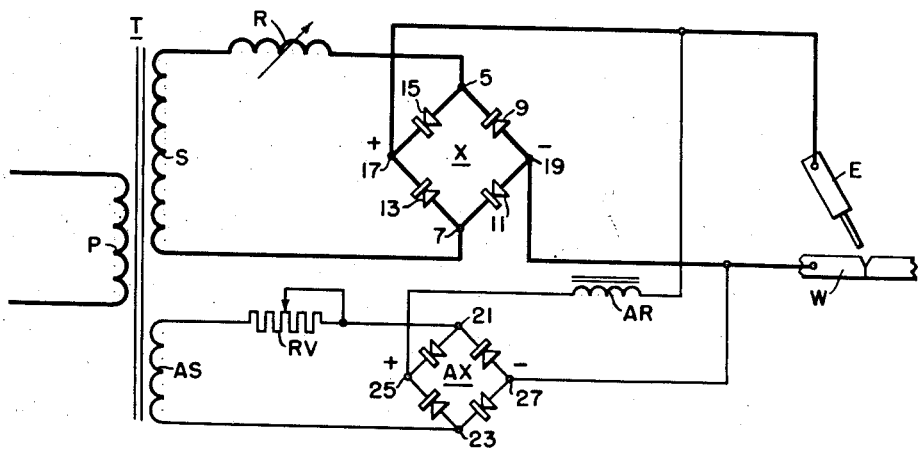
Figure 1 is a diagrammatic view of a preferred embodiment of my invention.

The apparatus shown in Fig. 1 includes a supply transformer T having a single-phase primary P and a plurality of secondaries S and AS, one of which S may be designated as the main secondary and the other AS as an auxiliary secondary. The primary P of the transformer T is adapted to be connected to a single-phase alternating-current supply (not shown), for example, of the commercial 25, 50 or 60 cycle type.

The main secondary S is connected, through a variable reactor R by means of which the magnitude of its potential is adjusted, to the input terminals 5 and 7 of a bridge rectifier X. The rectifying units 9, 11, 13 and 15 of this rectifier are preferably stacks or parts of stacks of the usual dry type such as selenium, copper oxide, or copper-magnesium-sulphide rectifiers. The output terminals 17 and 19 of this rectifier X are connected respectively to the work W and to a welding electrode E which may be of any desired type.

The auxiliary secondary AS is connected through a variable resistor RV designed to adjust the magnitude of its potential to the input terminals 21 and 23 of an auxiliary bridge rectifier AX, also of the dry type. One output terminal 25 of this rectifier AX is connected through a smoothing reactor AR to the welding electrode E; the other 27 is connected directly to the work.

The main secondary S and its associated rectifier X are designed to deliver substantially all of the current required for welding to the welding electrode E and the work W. The auxiliary secondary AS and its rectifier AX are designed to deliver the current necessary to maintain the arc when the current delivered by the main rectifier drops to a relatively low value. In practice, the main rectifier circuit S—X is capable of delivering up to 250 amperes while the auxiliary rectifier circuit AS—AX delivers of the order of 10 amperes.

To start a welding operation, the electrode E is brought into contact with the work W so that current flows between the electrode and the work. Immediately thereafter the electrode E is separated from the work, producing an arc. The arc then continues to burn stably between the electrode E and the work W, either melting a separate filler (not shown) which is fed adjacent to the work or melting the electrode itself if it is consumable. If desired, the welding operation may take place in a shield of inert gas. The filler or melted electrode solidifies as the weld progresses and a joint is formed.

Figure 2:
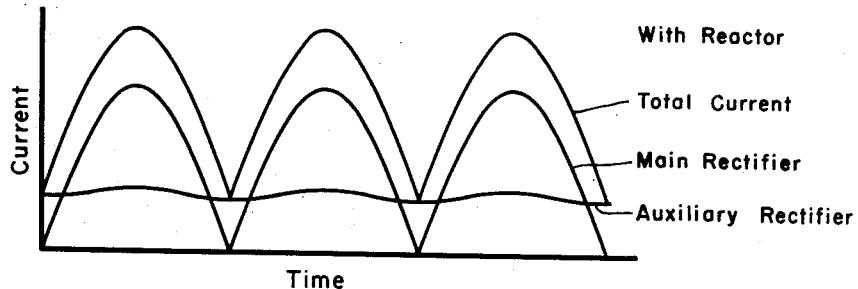
Fig. 2 is a graph illustrating the operation of Fig. 1.

The stability of the operation may be explained by connection with Fig. 2 in which arc current is plotted vertically and time horizontally. The total arc current which flows is illustrated by the upper curve of Figure 2. This current is composite consisting of the current transmitted by the main rectifier X which periodically approaches zero and the relatively constant current transmitted through the smoothing reactor AR by the auxiliary rectifier AX. The rectifier circuits are so designed that the gross current itself remains above a predetermined magnitude which is preferably set to be of the order of 10 amperes.

During starting, particularly at low currents, an initial surge is produced by the auxiliary rectifier which increases the tendency to start in the same manner as the "hot start" facilities of other apparatus. In addition, the auxiliary rectifier supplies a potential to blow out short-circuits instantaneously and prevent their causing instability.

Figure 3:
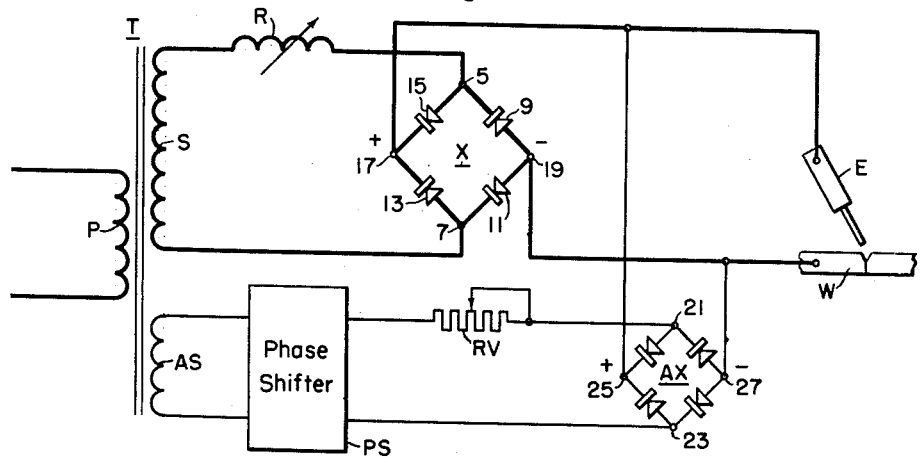
Fig. 3 is a diagrammatic view of a modification of my invention.
Figure 4:
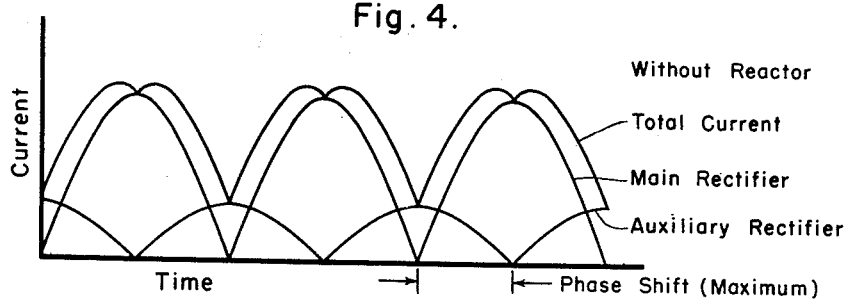
Figs. 4 and 5 are graphs illustrating the operation of Fig. 3.

As has been explained, a system, as shown in Fig. 3, in which the auxiliary rectifier (AX) is supplied through a phase-shifting device PS (connected between the secondary AS and AX) which shifts the phase of the current supplied thereby by approximately 90° with reference to the current supplied by the main rectifier X is within the scope of my invention. The ideal operation of such an arrangement is illustrated in Fig. 4 in which arc current is plotted vertically and time horizontally. In this case again, the upper curve corresponds to the total arc current which flows between the welding electrode and the work, the next curve to the main rectifier current, and the lower curve to the auxiliary rectifier current. It is seen that the total current is maintained above a predetermined minimum value which may be of the order of 10 amperes.

Figure 5:
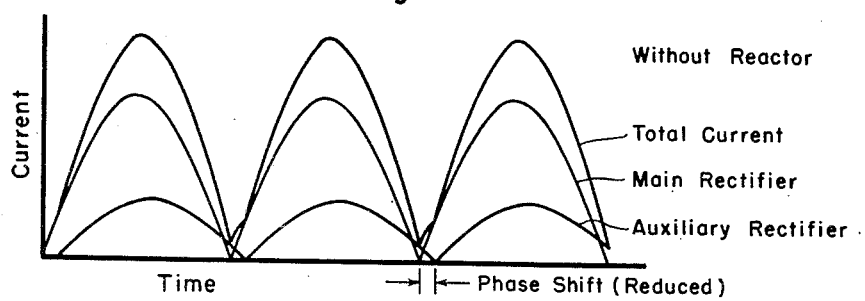

Fig. 4 corresponds to the situation at 0 volts arc voltage. As was explained, I have found that in such an arrangement, the phase of the auxiliary current relative to the main current shifts as the arc voltage varies. The phase shift for a variation for 45 volts arc voltage is illustrated in Fig. 5 in which the upper curve again represents the total current, the center curve the main rectifier current, and the lower curve the auxiliary rectifier current. In this case, it is seen that the auxiliary rectifier current is shifted in phase relative to the main rectifier current so that the total current falls to a low value and to an extent instability in the arc results. This instability together with the phase shifter, as has been explained, are eliminated by introducing the relatively small reactor in the auxiliary rectifier circuit. Under such circumstances, the auxiliary current corresponds to the generally horizontal curve shown in Fig. 2, and the arc is entirely stabilized.

Apparatus as disclosed in Fig. 1 which I have found to operate satisfactorily includes the following constants and parameters:

| | |
|---|---|
| Transformer | Dry type. |
| Supply to Primary P | 220 volts. |
| Primary P | 110 turns. |
| Secondary S | 40 turns. |
| Secondary AS | 10 to 30 turns. |
| Rectifier X, 4 stacks of 72 plates 4¼" x 6" | 18 cells. |
| Rectifier AX, 4 stacks of 8 plates 5" x 5" | 2 cells. |
| Reactor R | .01 to 0.1 henries. |
| Resistor RV | 4 to 20 ohms. |
| Smoothing reactor AR | 5 to 10 henries. |

Either straight or reverse polarity.

The above components and parameters may, of course, be varied over a wide range.

In accordance with another specific aspect of my invention the current in the auxiliary circuit could be stabilized by a capacitor connected between the output terminals 25 and 27, but such a capacitor would have a very high capacity. With a resistor RV of 4 ohms in the auxiliary circuit, the capacity should be of the order of 10,000 microfarads.

While I have shown and described certain specific embodiments of my invention, I am fully aware that many modifications thereof are possible. My invention therefore is not to be restricted except in so far as is necessitated by the prior art.

I claim as my invention:

1. Arc-welding apparatus including supply conductors to be connected to an alternating current supply; load conductors to be connected to a welding electrode and work; a main rectifier circuit interposed between said supply conductors and said load conductors for supplying direct current for welding under normal current conditions; and an auxiliary rectifier circuit, means connecting said auxiliary circuit between said load conductors and said supply conductors independently of said main circuit to supply current of the same polarity as said main circuit, said auxiliary circuit being dimensioned to supply current of substantially smaller magnitude than that supplied by said main rectifier so that when the current from said main circuit tends to drop below a predetermined magnitude, current is maintained through said auxiliary rectifier circuit; said apparatus being characterized by an auxiliary rectifier circuit which includes a reactor connected directly between the rectifier of said circuit and said load conductors.

2. Apparatus according to claim 1 characterized by the fact that the main rectifier circuit is designed to deliver current which rises to about 400 amperes during each half period of the supply and by an auxiliary rectifier circuit capable of delivering current of a substantially constant magnitude of the order of 10 amperes.

3. In combination, a transformer having a single-phase primary, a first secondary and a second secondary; a smoothing reactor; a pair of load conductors; a first full wave rectifier; a second full wave rectifier; connections connecting said first rectifier directly to said load conductors; and connections including said reactor connecting said second rectifier to said load conductors to conduct current of the same polarity as said first rectifier, said reactor being designed to smooth the output of said second rectifier, the circuit including said first secondary and said first rectifier being capable of supplying current of substantial magnitude and the circuit including said second secondary, said second rectifier and said reactor being capable of supplying current having a magnitude equal to a small fraction of said substantial magnitude.

4. An arc welder comprising an electrode terminal; a work terminal; a transformer having a single-phase primary and a secondary; a rectifier having input and output terminals, means connecting said input terminals to said secondary; means connecting said output terminals directly to said electrode terminal and said work terminal respectively so that fluctuating direct current may be supplied to said electrode and work terminals; and direct current potential supply means in addition to said rectifier and including inductive reactance means connected to said electrode and work terminals for maintaining the current flow to said electrode and work terminals above a predetermined magnitude in spite of the decrease of the current from said rectifier below said magnitude, the said welder being characterized by a rectifier capable of supplying up to 400 amperes and by potential supply means capable of supplying about 10 amperes.

5. Arc-welding apparatus including supply conductors to be connected to an alternating current supply; load conductors to be connected to a welding electrode and work; a main rectifier circuit interposed between said supply conductors and said load conductors for supplying direct current for welding under normal current conditions; and an auxiliary rectifier circuit, means connecting said auxiliary circuit between said load conductors and said supply conductors independently of said main circuit to supply current of the same polarity as that supplied in said main rectifier circuit, said auxiliary circuit being dimensioned so that when the current from said main circuit tends to drop below a predetermined magnitude, current is maintained through said auxiliary rectifier circuit; said apparatus being characterized by an auxiliary rectifier circuit which includes a reactor connected directly between the rectifier of said circuit and said load conductors.

6. In combination a pair of load conductors, first transformer means capable of supplying current of high magnitude and having output terminals, first rectifier means having alternating and direct current terminals, means connecting said output terminals to said alternating current terminals, means for connecting said direct-current terminals directly to said conductors, second transformer means capable of supplying current of low magnitude, and having output terminals, second rectifier means having alternating and direct-current terminals, means connecting said last-named output terminals to said last-named alternating current terminals, and means including a reactor capable of maintaining said last-named current at a predetermined magnitude for connecting said last-named direct-current terminals to said conductors.

References Cited in the file of this patent

UNITED STATES PATENTS

| 1,888,360 | Roberts | Nov. 22, 1932 |
| 2,473,928 | White | June 21, 1949 |

FOREIGN PATENTS

| 596,726 | Great Britain | Jan. 9, 1948 |
| 647,712 | Great Britain | Dec. 20, 1950 |
| 679,292 | Germany | Aug. 2, 1939 |
| 742,151 | France | Dec. 21, 1932 |